Patented Jan. 24, 1950

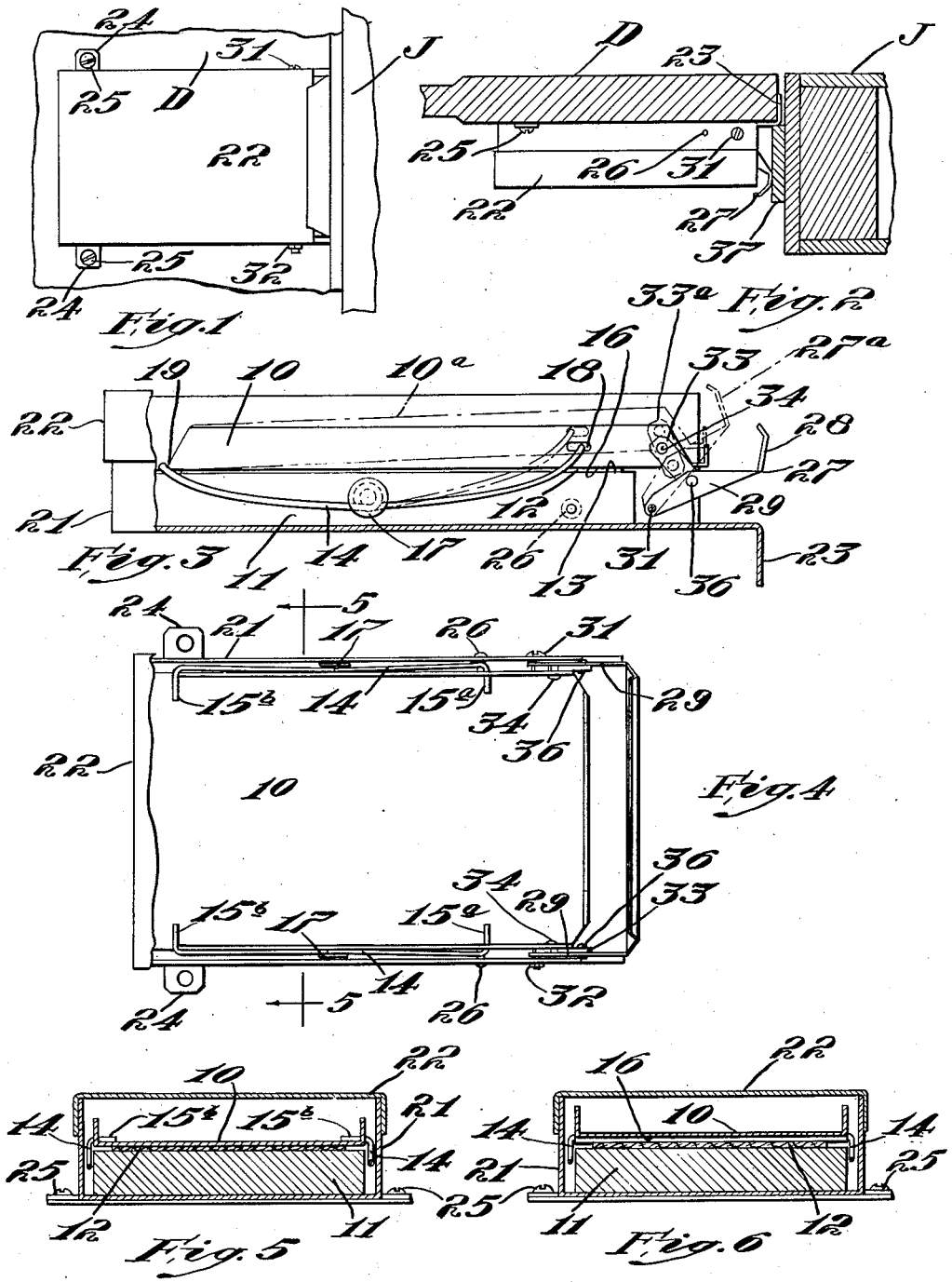

2,495,366

UNITED STATES PATENT OFFICE 2,495,366

INSECT EXTERMINATING DEVICE

William M. Edmonstone, Hyde Park, Mass.

Application January 31, 1948, Serial No. 5,615

2 Claims. (Cl. 43—132)

In protecting susceptible fabrics from the depredations of moth larvae the usual method has been to employ moth repellant crystals and to spray periodically with a toxic liquid. In many cases such precautions do not give the desired protection as moths prefer to deposit their eggs in dark and hidden locations where the larvae do not come in contact with the spray. In other cases the adult moths are repelled by the spray and proceed further to lay their eggs elsewhere. The spraying liquid is expensive and the protection afforded thereby is often only temporary. Many sprays are disagreeable in odor and in the case of a person allergic thereto cause unpleasant and sometimes dangerous physiological reactions.

Objects of this invention are to provide a device which indirectly protects susceptible fabrics from the depredations of the larvae of moths, buffalo bugs and similar insects, which destroys the larvae of these insects, which is long-lasting in its action, which is safe, odorless and effective to use, which is economical to construct and use, and which can be used as a substitute for crystals and sprays or as a supplementary device for the extermination of these fabric destroying insects.

In a broad aspect the invention contemplates an insect exterminating device of the type operated by a door comprising two juxtaposed members having relative movement towards and from each other. One of the members is adapted to support insect attracting material in the space between the two members. Means are provided for attaching one of the members to a door to provide relative movement between the members in response to the movement of the door. Preferably the means includes a spring and a connection between the door and one of the members.

In another aspect the relative motion between the members is in opposite directions, a spring being used to produce the relative motion in one direction and a connection between the door and one of said members producing the relative motion in the opposite direction. In a more specific aspect the members are moved toward each other by a spring which is attached therebetween. The movement in the other direction is produced by a lever attached to one member and operated by the door.

In another aspect the juxtaposed members are surrounded by an enclosure so that light is excluded from the space between the members.

In a more specific aspect the insect exterminating device comprises two juxtaposed members each with a plane surface having a relative movement towards and from the other surface. One of the surfaces is adapted to support an insect attracting material in the space between the two members. Surrounding the members is an enclosure so that light is excluded from the space therebetween. The members are moved toward each other so that the surfaces are held in intimate contact by a spring which is connected therebetween. A lever with one end abutting the door is pivotally attached to the enclosure and to one of the members to produce a movement of the members away from each other in response to the movement of the door.

For the purpose of illustration a typical embodiment of the invention is shown in the accompanying drawings in which:

Fig. 1 is a side elevation showing the invention attached to a door;

Fig. 2 is a plan view of the invention attached to a door and an adjacent jamb which are shown in section;

Fig. 3 is a plan view of the invention with the enclosure in partial section;

Fig. 4 is a side elevation with the enclosure removed;

Fig. 5 is a section on line 5—5 of Fig. 4 showing the invention in the tripped position, and Fig. 6 is a section on line 5—5 of Fig. 4 showing the invention in the cocked position.

In the particular embodiment chosen for the purpose of illustration the moth larvae exterminating device comprises two juxtapositioned members such as a movable clapper 10 (Fig. 3) and a base block 11. An insect attracting part such as a piece of felt 12 impregnated with grease or other moth attracting material is fastened to a plane surface 13 of the base block 11. A spring 14 is located on each side of the base block 11 to force the plane surface 13 and corresponding plane surface 16 of the clapper 10 into intimate contact with and thereby to crush the felt 12. Each of the springs 14 is pivotally connected with one side of the base block 11 by means of a large headed screw 17. A finger 15a (Fig. 4) at one end of each of the springs 14 engages a slot 18 in each side of the clapper 10. A similar finger 15b at the opposite end of each of the springs 14 rests on the upper surface 19 of the clapper 10 so as to keep surface 16 of the clapper always in close contact with surface 13 of base block 11 at the edge of the base block farthest from the door frame J.

An enclosure 21 is fastened to the base block 11 by means of a nail 26 on each side thereof. The enclosure 21 and its tight fitting cover 22 surround the clapper 10 and the base block 11 to exclude all light from the space therebetween so that an additional attraction is provided to induce the moths to lay eggs upon the felt 12. The enclosure 22 has a lip 23 and a tab 24 on each side thereof. Each tab 24 has a hole therein through which projects a screw 25 (Figs. 1 and 2) to cooperate with the lip 23 for attaching the device to a closet door D.

One end of the enclosure 21 is open so that a lever 27 is free to project therefrom. The lever 27 includes a connecting member 28 at each end of which is a tongue 29 projecting normally therefrom. The lever 27 pivots about a bolt 31, the body of which projects through a hole in each side of the enclosure 21 and through an aligned hole at one end of each of the tongues 29. The bolt 31 is maintained in position by an engaging nut 32. Each of the tongues 29 is pivotally connected to a respective side of the clapper 10 by a link 33, the connections being made by rivets 34 and 36 respectively.

A striker plate 37 (Fig. 2) is fastened to the door frame J in such a position as to contact the lever 27 when the door D is in the closed position. As is shown in Figs. 1 and 2, the device is fastened by means of the screws 25 and the lip 23 to the inside of the closet door D preferably near the floor where the adult moths prefer to hover. When the closet door D is closed, the member 28 of the lever 27 contacts the striker plate 37 and is moved thereby to the position 27a (Fig. 3). The link 33 and the clapper 10 are simultaneously moved to the positions 33a and 10a respectively so that there is a clearance between the felt 12 and the surface 16 of the clapper 10 as is clearly indicated in Fig. 6.

Experience has shown that moths prefer soiled or greasy materials in a darkened location as a depository for their eggs. The adult moths have a well developed sense of smell which guides them past the clean fabrics stored in the closet to seek the grease impregnated felt 12. The clearance holes around the lever 27 permit an easy access to the device so that the moths can enter to deposit their eggs upon the grease impregnated felt 12 when closet door D is closed.

Whenever the door D is opened, the lever 27 is released and the springs 14 compress the felt 12 between the surface 16 of the clapper 10 and the base block 11 as is shown in Fig. 5 thereby crushing any larvae which may have hatched.

It will be noted that the enticing and periodic destruction of the larvae in this manner results in a twofold advantage not present in other methods of moth control. First the adult moths are attracted to a location where the larvae can develop without damaging valuable fabrics. Second, the larvae are prevented from developing into adult moths so that the number of moths is prevented from multiplying and increasing the possibility of future depredations.

It should be understood that the present disclosure is for the purpose of illustration only and that this invention includes all modifications and equivalents which fall within the scope of the appended claims.

I claim:

1. An insect exterminating device of the door operated type comprising two juxtaposed members adapted for relative movement towards and from each other in opposite directions, one of the members being adapted to support insect attracting material in the space between the two members, an enclosure surrounding said members so that light is excluded from the space therebetween, a spring for producing the relative motion in one direction and a lever attached to one member and adapted to be operated by the door for producing the relative motion in the opposite direction.

2. An insect exterminating device of the door operated type comprising two juxtaposed members each with a plane surface adapted for relative movement towards and from the other surface in opposite directions, one of the surfaces being adapted to support insect attracting material in the space between the two members, an enclosure surrounding said members so that light is excluded from the space therebetween, a spring connected between and relatively moving said members towards each other so that the surfaces are forced into intimate contact with said materials, and a lever with one end adapted to abut a striker plate, said lever being pivotally attached to the enclosure and to one of said members whereby the relative movement of the members away from each other is adapted to be produced by the movement of the door.

WILLIAM M. EDMONSTONE.

REFERENCES CITED

The following references are of record in the file of this patent:

UNITED STATES PATENTS

| Number | Name | Date |
|---|---|---|
| 1,439,874 | Dillin | Dec. 26, 1922 |
| 2,113,057 | Miller | Apr. 5, 1938 |